3,004,939
METHOD OF MAKING POLYURETHANE RUBBER ARTICLES

Henry Roger Varvaro, Paterson, N.J., assignor to United States Rubber Company, New York, N.Y., a corporation of New Jersey
No Drawing. Filed Aug. 19, 1958, Ser. No. 755,866
9 Claims. (Cl. 260—22)

This invention relates to a method of making polyurethane rubber articles and, more particularly, it relates to a method involving preparing a liquid polyurethane composition which is stable enough to permit a shaping operation to be carried out, after which the composition is readily cured to an elastomeric state in which it has excellent physical properties.

The invention is based upon the discovery that if a solid primary diamine in particulate form is suspended in a viscous fluid carrier, and thereafter dispersed in a liquid polyurethane prepolymer, there is formed a composition which has ample "pot life," that is, there is ample time to perform a shaping operation such as molding or coating, without any undesirable tendency for the diamine to separate or settle out. Although the composition is stable enough to permit shaping operations to be performed at leisure, it is at the same time a rapidly curable composition, and application of even moderate heat is sufficient to advance the composition to a cured, elastomeric state.

The liquid polyurethane prepolymers employed in the invention are themselves well known materials, generally prepared by reacting a polymer having terminal hydroxyl groups, such as a polyester or the like, with an excess of an organic polyisocyanate.

The polyisocyanates employed in preparing the liquid intermediate reaction product or prepolymer are generally diisocyanates, for example, polymethylene diisocyanates such as ethylene diisocyanate, hexamethylene diisocyanate and tetramethylene diisocyanate; alkylene diisocyanates such as propylene - 1,2 - diisocyanate; cycloalkylene diisocyanate such as 1,4-diisocyanatocyclohexane, as well as aromatic diisocyanate such as m- and p-phenylene diisocyanate, toluene diisocyanate, p,p' - diphenyl diisocyanate and 1,5 - napthalene diisocyanate, in which category I include aliphatic-aromatic diisocyanates such as p,p'-diphenylmethane diisocyanate and phenylethane diisocyanate

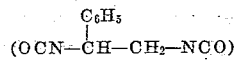

Triisocyanates are also suitable, such as those having isocyanate groups attached to a trivalent hydrocarbon radical, whether an aliphatic, aromatic, or aliphatic-aromatic radical as in butane-1,2,2-triisocyanate, benzene-1,3,5-triisocyanate, diphenyl-2,4,4'-triisocyanate, diphenyl-4,6,4'-triisocyanate, toluene-2,4,6-triisocyanate, ethyl benzene - 2,4,6-triisocyanate and triphenylmethane - 4,4',4''-triisocyanate. Polyisocyanates derived from corresponding substituted hydrocarbon radicals, such as monochlorobenzene-2,4,6-triisocyanate, may also be used.

The poly-functional material, or polymer containing terminal hydroxyl groups, with which the foregoing polyisocyanate is reacted to provide the liquid prepolymer, is typically a substantially anhydrous polyester made from a glycol, for example, ethylene glycol or a mixture of glycols, and a saturated dicarboxylic acid, for example, adipic acid, using an excess of glycol over the acid so that the resulting polyester contains terminal alcoholic hydroxyl groups. Such polyester may be linear, or it may be branched, the latter effect being achieved by including in the preparation a trialcohol, such as trimethylolpropane or trimethylolethane. Usually such an amount of glycol is used as to give a polyester having a hydroxyl number of 225 to 22, and preferably 112 to 37, and a low acid number of less than 6 and preferably less than 1. In general, the most suitable polyesters are chiefly linear in type with melting point levels of 90° C. or lower. The molecular weight may range between the limits of 500 to 5,000, but is preferably within the range from 1,000 to 3,000. Many of the useful polyesters are obtained by a condensation reaction of one or more saturated alkyl dibasic acids or acid anhydrides and/or aryl dibasic acids or anhydrides with one or more saturated glycols. Thus, for example, good results are obtained using polyethylene-propylene adipate, having a molecular weight between 1,900 and 2,000, formed by esterifying a mixture of ethylene glycol and propylene glycol in a mole ratio of 70 to 30, respectively, with adipic acid. Other examples of suitable polyesters are polyethylene adipate, polyethylene adipate (70)-phthalate(30), polyneopentyl sebacate, etc. Similarly, esters of such acids as succinic, glutaric, adipic, pimelic, suberic, azelaic and sebacic acid with such glycols as ethylene glycol, propylene glycol; 1,3-propane diol; 1,4-butane-diol; diethylene glycol, dipropylene glycol, etc., may be used.

As an alternative to the polyesters just described there may be used (for reaction with the polyisocyanate) one or more members of the class of elastomer-yielding polyethers. Such polyethers are typically anhydrous chain-extended polyethers possessing ether linkages (—O—) separated by hydrocarbon chains either alkyl or aryl in nature. The ether should also contain terminal groups reactive to isocyanate, such as alcoholic hydroxyl groups. Such polyether may be linear, or it may be branched. Usually the polyethers used are chiefly linear in type with melting point levels of 90° C. or lower. The molecular weight may range from 500 to 5,000 (i.e., hydroxyl number of about 225 to 22), but is preferably within the range of 750 to 3,500 (i.e., hydroxyl number of about 150 to 45). Examples of polyethers used are polyethylene glycol, polypropylene glycol, polypropylene-ethylene glycol, and polytetramethylene glycol.

Polyethers not only can be used in place of the polyester but can be used in conjunction with the polyester either as an added reagent or as an intimate part of the polyester molecule thus forming a poly-ether-ester. Examples of such poly-ether-esters are poly diethylene glycol adipate and polytriethylene glycol adipate. Also, in preparing the fluid prepolymer, a polyamide can be used in conjunction with a polyester either as an added reagent or as an intimate portion of the polyester in the form of a polyester-polyamide. In the latter case a portion of the glycol to be used in the preparation of the polyester is replaced by a diamine such as hexamethylene diamine. An example of such a polyester amide is polyethylene glycol hexamethylene diamine adipate-adipamide. It will be understood that numerous other combinations of starting material, useful for preparing polyurethane foams, are now well known and the invention applies to all such known polyurethane foam systems.

The amount of polyisocyanate that is combined with the polyester, polyether, or similar poly-functional polymer, in preparing polyurethane, frequently ranges from 1.0 to 1.25 equivalents of isocyanate for each equivalent of the total hydrogens reactive to isocyanate which are present in the polyester or the like. The invention frequently involves using from about 1.02 to about 2 moles of diisocyanate per mole of polyester or the like.

The diisocyanate or the like functions as a chain lengthening chemical with the polyester or the like, forming a urethane polymer. The resulting liquid polyurethane is termed the "prepolymer" in this process.

Such a liquid polyurethane prepolymer containing available isocyanate groups is capable of being converted into a cured, rubbery state by the action of a primary diamine. However, if a primary diamine is dissolved directly in the prepolymer the curing action is generally so rapid that there is scarcely time to perform a desired shaping operation before the mixture beings to "set up" to the extent that it becomes unworkable for all practical purposes.

In the method of the present invention, a crystalline primary diamine is employed as the curing agent and it is first dispersed or suspended in particulate form in a viscous medium, after which such suspension is dispersed uniformly in the liquid prepolymer.

An outstanding feature of this method is that although a normally very rapid curing agent (primary diamine) is used, the compositions nevertheless have ample "pot life" or stability, so that a desired shaping operation can be carried out at leisure. The reason for this is that the particulate primary diamine, dispersed in a viscous carrier liquid and suspended in the liquid polyurethane prepolymer, exists in the mix as a uniformly dispersed material which actually remains as a separate phase for a substantial period of time. It appears that as long as the primary diamine is thus maintained in the composition as a distinct phase, rapid cure of the polyurethane does not take place. However, a remarkable advantage of the composition is that as soon as it is heated to a temperature at least as high as the melting point of the diamine, the essentially two phase nature of the mix is lost, and rapid interaction between the diamine and the prepolymer takes place.

The particular characteristic of such a mixture that it is desired to emphasize here lies in the manner in which a viscous liquid is used as the suspending medium or carrier for the solid primary diamine. The viscous liquids most suitable for this purpose are glycols, especially polymeric glycols (polyether glycols), such as polyethylene or polypropylene glycol, usually of molecular weight of from 500 to 5,000. Any of the polyethers described above for preparing the prepolymer may be used. Castor oil is suitable for this purpose, as are polyesters containing terminal hydroxyl groups, such as the polyesters described above for preparing the prepolymers. The suspension of the diamine in the glycol or the like is blended thoroughly with the liquid polyurethane prepolymer, at a temperature below the melting point of the diamine, thereby providing a dispersion of solid diamine particles in the liquid prepolymer, from which there is no undesirable tendency for the diamine particles to settle out. Such a composition develops optimum physical properties upon subsequent cure because the suspending medium, namely the glycol or the like, is not merely an inert substance, but actually reacts chemically with the polyurethane during the cure and constitutes a desirable chemically bound modifying agents in the final cured product. In this respect the glycol performs a unique dual function.

By using the viscous suspending medium described, the diamine can be mixed into the prepolymer readily with the greatest uniformity even at relatively low temperatures at which the prepolymer is very viscous. Such low temperatures avoid any tendency to premature cure.

It may be mentioned that the primary diamines suitable for incorporation with the liquid prepolymer in the form of a suspension in a glycol or the like in accordance with the invention are crystalline materials, in solid, particulate form, and preferably finely powdered when added to the mix. They are incorporated in the mixture at a temperature below the melting point of the diamine, suitable at room temperature or at a somewhat elevated temperature. Suitable materials include the following crystalline diamines:

| Diamine: | melting point, °C. |
|---|---|
| Naphthalene diamine | 189 |
| 2,2-diaminodiphenylmethane | 81 |
| Benzidine | 128 |
| 4,4'-diaminodiphenyl ether | 186 |
| 2,4-diaminotoluene | 99 |
| 1,4-diaminobenzene | 140 |
| Diaminoanisole (1; 2,4) | 68 |
| Dichlorobenzidine | 131 |
| 3,3'-dichloro-4,4-diamino-diphenylmethane | 110 |

In general, the diamines employed have a melting point above 40° C. Any of these materials may be suspended in the viscous glycol or the like of the kind previously described, suitably in the proportions above indicated, and dispersed in any of the liquid prepolymer systems derived from the described diisocyanates and polyesters or the like. The advantages of such procedure are, as indicated, long pot life coupled with rapid cure when desired, freedom from undesirable tendency of the diamine to settle out, and optimum physical properties in the final cured product.

Conventional modifying ingredients, fillers, pigments and the like may be included in the preparation, either of the prepolymer, or of the final two-phase curable mix. Compositions formulated in this manner are useful for coating surfaces of various kinds as well as for impregnating such materials as textiles. These compositions, which are liquids or pastes, may be cast or injection molded in desired shapes, or used for spreading, dipping, or spraying (especially when diluted with a suitable solvent). In this manner there may be prepared such articles as polyurethane-coated fabric ducts or air springs, tires or parts for tires, gloves, and all kinds of dipped articles, shoes or parts for shoes such as foxing, clothing, golf balls, industrial belts including textile processing aprons, upholstery, liners for tubeless tires, and useful supported or unsupported films, coatings, or molded articles of all sorts.

A specific example of the preparation of a polyurethane prepolymer for use in the invention is as follows. A polyester is first prepared by heating at 220–230° C. the following mixture:

| | Moles |
|---|---|
| Propylene glycol | 11 |
| Ethylene glycol | 4.25 |
| Adipic acid | 11.25 |

In the course of the preparation of the polyester the unreacted glycol is removed by vacuum distillation, and the extent of the distillation determines the molecular weight of the polyester, as calculated from the acid number and the hydroxyl number. The polyester used in this example has a molecular weight of about 2,000, a hydroxyl number of about 52 and an acid number of about 1.5.

To make the liquid prepolymer 1 mole of the foregoing polyester is mixed with 2 moles of methylene bis paraphenylene isocyanate and reacted at 90° C. for 1½ hours, to yield a curable material having terminal isocyanate groups capable of reacting with agents containing active hydrogen atoms.

A dispersion or suspension is then prepared by mixing 100 parts by weight (or, suitably, from 50 to 150 parts) of powdered 3,3'-dichloro-4,4'-diaminodiphenylmethane in 100 parts of polypropylene glycol having a molecular weight of about 2,000. These materials may be mixed on a 3 roll paint mill to form a smooth, uniform paste from which the diamine has no undesirable tendency to settle out, and which is readily miscible with the prepolymer.

About 10 parts (or about 5 to 25 parts) of the diamine dispersion in polypropylene glycol is then mixed intimately with 100 parts of the described prepolymer at a temperature of 70° C. In general, sufficient diamine is used to provide about 0.3 to 1.5 moles of diamine for each mole of prepolymer (in this connection, a mole of prepolymer may be regarded as the sum of the weight of one mole of the polyester plus the weight of two moles of the diisocyanate). There is thus readily formed a two-phase system from which the diamine does not tend to separate undesirably. This mix typically has a pot life of 40 minutes or so. The mix is poured into a mold (previously coated with a mold release agent such as the usual dimethyl silicone oil composition). Although the mix would eventually cure of itself without external heating, optimum results are obtained by using elevated temperatures, at least to finish the cure (e.g. 200°–350° F., for a period of from ¼ to 2 hours). For this purpose the mold may be pre-heated before pouring or injecting the composition. The minimum temperature used to induce rapid cure is the melting point of the diamine, at which temperature the mixture tends to lose its essentially two-phase nature. A good cure is obtained in about 1 hour at 300° F. This cured molded article may typically have a Shore A hardness of about 85 to 95 and a tensile strength of about 4,000 to 6,000 pounds per square inch.

Similar results are obtainable by starting with a polyester made from 1 mole of adipic acid, 1.15 moles of diethylene glycol, 0.083 mole of trimethylol ethane and 0.055% of p-toluene sulfonic acid. Such polyester has an acid number of 2.5 or less, and an hydroxyl number of 58–65.

In the further examples that follow two different prepolymers are used both of which are prepared from the same polyester. The polyester is prepared from .42 mole of propylene glycol, .98 mole of ethylene glycol and 1.0 mole of adipic acid. The esterification is carried out at 200–235° C. until an acid number less than 1.5 is reached and the hydroxyl number is about 56.

Prepolymer A is prepared, by stirring the above polyester (1 mole) with 4,4'-diphenyl methane diisocyanate (2 moles) at 80–90° C. for 1½ hours.

Prepolymer B is prepared by a similar process except that 2,4-toluene diisocyanate is used with the polyester.

Table I includes compositions of matter using Prepolymer A and a dispersion of 4,4'-dichlorobenzidine in an equal weight of polypropylene glycol, molecular weight 2,000. The diamine is dispersed in the viscous carrier to form a uniform paste which is ground on a three roll paint mill. Prepolymer A and each dispersion are mixed at 70° C., deaerated under vacuum, poured into a mold cavity and cured under pressure for 30 minutes at 305° F. The mold may be preheated if desired. Physical properties are shown in Table I.

*Table I*

|  | Ex. 1 | Ex. 2 | Ex. 3 |
|---|---|---|---|
| Prepolymer A | 100 | 100 | 100 |
| 4,4'-dichlorobenzidine dispersion in polypropylene glycol (50/50) | 9.3 | 11.69 | 15.03 |
| Physical properties cured 30'–305° F.: |  |  |  |
| Tensile strength, p.s.i | 5,700 | 5,600 | 5,500 |
| 100% Modulus, p.s.i | 510 | 530 | 600 |
| 200% Modulus, p.s.i | 710 | 760 | 830 |
| 300% Modulus, p.s.i | 990 | 1,090 | 1,120 |
| Percent Elongation | 700 | 600 | 700 |
| Tear ASTM Type C | 460 | 490 | 560 |
| Shore A hardness | 86 | 89 | 91 |

Table II includes cured stocks prepared in a similar manner from Prepolymer B.

*Table II*

|  | Ex. 4 | Ex. 5 | Ex. 6 | Ex. 7 | Ex. 8 |
|---|---|---|---|---|---|
| Prepolymer B | 100 | 100 | 100 | 100 | 100 |
| 4,4'-dichlorobenzidine-polypropylene glycol (equal weights) paste | 20 |  |  |  |  |
| 4,4'-dichlorobenzidine-castor oil (equal weights) paste |  | 20 |  |  |  |
| 3,3'-dichloro-4,4'diamino-diphenyl methane-polypropylene glycol (equal weights) paste |  |  | 20 |  |  |
| 3,3'-dichloro-4,4'diamino-diphenyl methane-castor oil (equal weights) paste |  |  |  | 20 |  |
| 3,3'-dichloro-4,4'diamino-diphenyl methane-polyester [1] (equal weights) paste |  |  |  |  | 20 |
| Cured 305° F.–60'. |  |  |  |  |  |
| Physical data: |  |  |  |  |  |
| Tensile strength, p.s.i | 4,400 | 4,040 | 2,750 | 3,670 | 4,100 |
| 300% Modulus | 1,200 | 780 | 750 | 740 | 640 |
| Percent Elongation | 560 | 680 | 430 | 590 | 430 |
| Tear ASTM Type C | 465 | 396 | 222 | 320 | 245 |

[1] Commercial polyester such as, e.g., diethylene sebacate, of 2200 molecular weight possessing terminal hydroxyl groups and an acid number of 2.0 or less. The commercial material known as "Paraplex G-50" sold by Rohm & Haas, may be used for this purpose.

Having thus described my invention, what I claim and desire to protect by Letters Patent is:

1. A method of making a polyurethane rubber article comprising in combination the steps of uniformly suspending in solid particulate form a crystalline primary diamine in a viscous suspending medium selected from the group consisting of a polyalkylene glycol having terminal hydroxyl groups and a molecular weight of from 500 to 5,000, a polyester having terminal hydroxyl groups which is a chain-extended self-condensation product of an ester of a glycol with a saturated dicarboxylic acid, having an acid number less than 6, a hydroxyl number of from 22 to 225, and a molecular weight of from 500 to 5,000, and castor oil, and thereafter thoroughly dispersing such suspension in a polyurethane prepolymer having terminal isocyanate groups which is an uncured, liquid reaction product of a polymer having terminal hydroxyl groups and having a molecular weight of from 500 to 5,000, selected from the group consisting of a polyalkylene glycol and a polyester which is a chain-extended self-condensation product of an ester of a glycol with a saturated dicarboxylic acid having an acid number less than 6 and a hydroxyl number of from 22 to 225 with an excess of an organic diisocyanate, to form a two-phase system in which the primary diamine exists as uniformly dispersed solid particles, the resulting fluid mixture being characterized by having ample pot life at temperatures below the melting point of the primary diamine, thereafter imparting a desired shape to the fluid mixture, and subsequently heating the mixture to a temperature above the melting point of the primary diamine, whereby the mixture cures to a solid, rubbery state in which the diamine and the said viscous suspending medium are chemically combined with the prepolymer.

2. A method as in claim 1, in which the said polymer having terminal hydroxyl groups employed in preparing the said prepolymer is a polyester.

3. A method as in claim 2, in which the viscous suspending medium for the diamine is a polyalkylene glycol.

4. A method as in claim 3, in which the said polyether is polypropylene glycol.

5. A method as in claim 2, in which the viscous suspending medium for the diamine is a polyester.

6. A method as in claim 2, in which the viscous suspending medium for the diamine is castor oil.

7. A method as in claim 2, in which the primary diamine is 3,3'-dichloro-4,4'-diaminodiphenyl methane.

8. A method as in claim 2, in which the primary diamine is 4,4'-dichlorobenzidine.

9. A method of making a fluid polyurethane prepolymer composition which is rapidly curable to a rubbery state upon heating but which has ample pot life at ordinary temperatures comprising uniformly suspending in solid particulate form a crystalline primary diamine in a suspending liquid which is a viscous polyalkyline glycol having terminal hydroxyl groups and a molecular weight of from 500 to 5,000, and thereafter thoroughly dispersing such suspension in a polyurethane prepolymer which is an uncured, liquid reaction product of a polymer having terminal hydroxyl groups and a molecular weight of from 500 to 5,000 selected from the group consisting of a polyalkylene glycol and a polyester which is a chain-extended self-condensation product of an ester of a glycol with a saturated dicarboxylic acid having an acid number less than 6 and a hydroxyl number of from 22 to 225 with an excess of an organic diisocyanate to form a two-phase system in which the primary diamine exists as uniformly dispersed solid particles, the resulting composition being rapidly curable to an elastomeric state upon heating to a temperature in excess of the melting point of the primary diamine.

(References on following page)

References Cited in the file of this patent

UNITED STATES PATENTS

| | | |
|---|---|---|
| 2,778,810 | Muller et al. | Jan. 22, 1957 |
| 2,779,689 | Reis | Jan. 29, 1957 |
| 2,858,298 | Burt | Oct. 28, 1958 |
| 2,870,114 | Schrimpton et al. | Jan. 20, 1959 |

FOREIGN PATENTS

| | | |
|---|---|---|
| 733,624 | Great Britain | July 13, 1955 |

OTHER REFERENCES

F. B., German application Serial No. F17426, printed November 15, 1956 (KL 39b 22$^{04}$).